United States Patent
Miyawaki

(10) Patent No.: US 10,855,963 B2
(45) Date of Patent: Dec. 1, 2020

(54) ELECTRO-OPTICAL DEVICE AND ELECTRONIC APPARATUS

(71) Applicant: SEIKO EPSON CORPORATION, Tokyo (JP)

(72) Inventor: Daisuke Miyawaki, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/579,985

(22) Filed: Sep. 24, 2019

(65) Prior Publication Data

US 2020/0099907 A1 Mar. 26, 2020

(30) Foreign Application Priority Data

Sep. 25, 2018 (JP) .................. 2018-178408

(51) Int. Cl.
  *H04N 9/31* (2006.01)
  *G02F 1/1335* (2006.01)

(52) U.S. Cl.
  CPC ..... *H04N 9/3197* (2013.01); *G02F 1/133512* (2013.01); *G02F 1/133526* (2013.01); *G02F 2001/133565* (2013.01)

(58) Field of Classification Search
  CPC .. G03B 21/006; G03B 21/145; G03B 21/208; G03B 21/2066; H04N 9/315; H04N 9/3108; H04N 9/3141; H04N 9/3152; H04N 9/3197; G02B 3/0056; G02B 3/0068; G02F 1/1368; G02F 1/133512; G02F 1/133514; G02F 1/133526; G02F 1/134309; G02F 1/134336; G02F 1/136209
  See application file for complete search history.

(56) References Cited

U.S. PATENT DOCUMENTS

| | | | |
|---|---|---|---|
| 2005/0174649 A1 | 8/2005 | Okada et al. | |
| 2005/0253976 A1* | 11/2005 | Sekiguchi | G02F 1/1362 349/40 |
| 2015/0253633 A1* | 9/2015 | Tsuchiya | G02F 1/134309 349/43 |

(Continued)

FOREIGN PATENT DOCUMENTS

| JP | 2000-305472 A | 11/2000 |
|---|---|---|
| JP | 2003-294912 A | 10/2003 |

(Continued)

*Primary Examiner* — Sultan Chowdhury
(74) *Attorney, Agent, or Firm* — Oliff PLC

(57) ABSTRACT

A counter substrate of an electro-optical device inclueds a first lens, a first optical path length adjustment layer, a second lens, and a second optical path length adjustment layer. A first partition portion is provided between the first lens and the first optical path length adjustment layer. A second partition portion is provided between the first optical path length adjustment layer and the second lens. The second partition portion includes, across the entire second partition portion in an extending direction thereof, a plurality of first openings bored through the second partition portion. Thus, the ITO film can be formed in a region, where the first optical path length adjustment layer is covered by the second partition portion, under a condition similar to the condition for a region, where the first optical path length adjustment layer is not covered by the second partition portion.

13 Claims, 13 Drawing Sheets

(56) References Cited

U.S. PATENT DOCUMENTS

| | | |
|---|---|---|
| 2015/0277187 A1 | 10/2015 | Akasaka |
| 2016/0018567 A1 | 1/2016 | Ito |
| 2016/0018568 A1 | 1/2016 | Ito et al. |
| 2016/0109752 A1 | 4/2016 | Tateno et al. |
| 2018/0074367 A1 | 3/2018 | Miyawaki et al. |

FOREIGN PATENT DOCUMENTS

| | | |
|---|---|---|
| JP | 2015-197577 A | 11/2015 |
| JP | 2016-024206 A | 2/2016 |
| JP | 2016-024207 A | 2/2016 |
| JP | 2016-224323 A | 12/2016 |
| JP | 2018-045018 A | 3/2018 |

\* cited by examiner

ELECTRO-OPTICAL DEVICE AND ELECTRONIC APPARATUS

The present application is based on, and claims priority from JP Application Serial Number 2018-178408, filed Sep. 25, 2018, the disclosure of which is hereby incorporated by reference herein in its entirety.

BACKGROUND

1. Technical Field

The present disclosure relates to an electro-optical device provided with a first lens and a second lens that overlap a pixel electrode in plan view, and an electronic apparatus.

2. Related Art

An electro-optical device, used as a light valve and the like of a projection-type display device, includes an element substrate provided with a pixel electrode in a display region, and a counter substrate provided with a common electrode that has a light-transmitting property and faces the pixel electrode, where a liquid crystal layer is disposed between the element substrate and the counter substrate. In the electro-optical device, for the purpose of controlling a travel direction of light source light incident from the counter substrate side, the counter substrate is provided with a first lens that overlaps the pixel electrode in plan view between the common electrode and the element substrate, a first light-transmissive layer provided between the first lens and the common electrode, a second lens that overlaps the first lens in plan view between the first light-transmissive layer and the common electrode, and a second light light-transmissive layer provided between the second lens and the common electrode (see JP-A-2016-24206).

Further, in the electro-optical device described in JP-A-2016-24206, a first partition portion extending along an outer edge of the display region is provided between the first lens and the first light-transmissive layer, and a second partition portion extending along the outer edge of the display region is provided between the first optical path length adjustment layer and the second lens.

However, when the structure described in JP-A-2016-24206 is adopted in an electro-optical device in a normally-black mode, there is a problem in that quality of an image is reduced at an end portion near a partition (first partition portion and second partition portion) of a display region in such a way that the image is unnaturally brighter than the other region at the end portion in the display region.

SUMMARY

As a result of examination by the inventor of the present application in order to resolve the problem above, the inventor has acquired knowledge that crystallinity of an ITO film constituting a common electrode is locally rough at an end portion of a display region. Thus, it is considered that alignment of liquid crystal molecules is disturbed due to a disturbance of a structure of an alignment film at the end portion of the display region, and a light leakage occurs. It is also considered the cause of the crystallinity of the ITO film being locally rough at the end portion of the display region derives from a variation in crystallinity of the ITO film which occurs during common electrode formation, in which a leakage of gas generated in a first light-transmissive layer (first optical path length adjustment layer) is suppressed in a second partition portion, and, as a result, an influence of the gas, magnitude of stress, and the like vary between the end portion of the display region and the other region. The present disclosure has been achieved based on the knowledge above, and has the following configuration.

One aspect of an electro-optical device according to the present disclosure includes an element substrate including a pixel electrode in a display region, a counter substrate including a common electrode that has a light-transmitting property, and facing the pixel electrode, and a liquid crystal layer disposed between the element substrate and the counter substrate. The counter substrate includes a first lens disposed between the counter substrate and the common electrode and overlapping the pixel electrode in plan view, a first optical path length adjustment layer disposed between the first lens and the common electrode, a second lens disposed between the first optical path length adjustment layer and the common electrode and overlapping the first lens in plan view, a second optical path length adjustment layer disposed between the second lens and the common electrode, a first partition portion having a light shielding property, the first partition portion being disposed between the first lens and the first optical path length adjustment layer and extending along an outer edge of the display region, and a second partition portion having a light shielding property, the second partition portion being disposed between the first optical path length adjustment layer and the second lens and extending along the outer edge of the display region. The second partition portion includes, along the outer edge of the display region, a plurality of first openings bored through the second partition portion.

Another aspect of an electro-optical device according to the present disclosure includes an element substrate including a pixel electrode in a display region, a counter substrate including a common electrode that has a light-transmitting property, and facing the pixel electrode, and a liquid crystal layer disposed between the element substrate and the counter substrate. The counter substrate includes a first lens disposed between the counter substrate and the common electrode and overlapping the pixel electrode in plan view, a first optical path length adjustment layer disposed between the first lens and the common electrode, a second lens disposed between the first optical path length adjustment layer and the common electrode and overlapping the first lens in plan view, a second optical path length adjustment layer disposed between the second lens and the common electrode, and a partition portion disposed only between the first lens and the first optical path length adjustment layer, among between the first lens and the first optical path length adjustment layer and between the first optical path length adjustment layer and the second lens, and extending along an outer edge of the display region.

The electro-optical device according to an aspect of the present disclosure is used for an electronic apparatus such as a projection-type display device. The projection-type display device includes a light source unit configured to emit light to be supplied to the electro-optical device, and a projection optical system configured to project light modulated by the electro-optical device.

DESCRIPTION OF EXEMPLARY EMBODIMENTS

Figure 1:
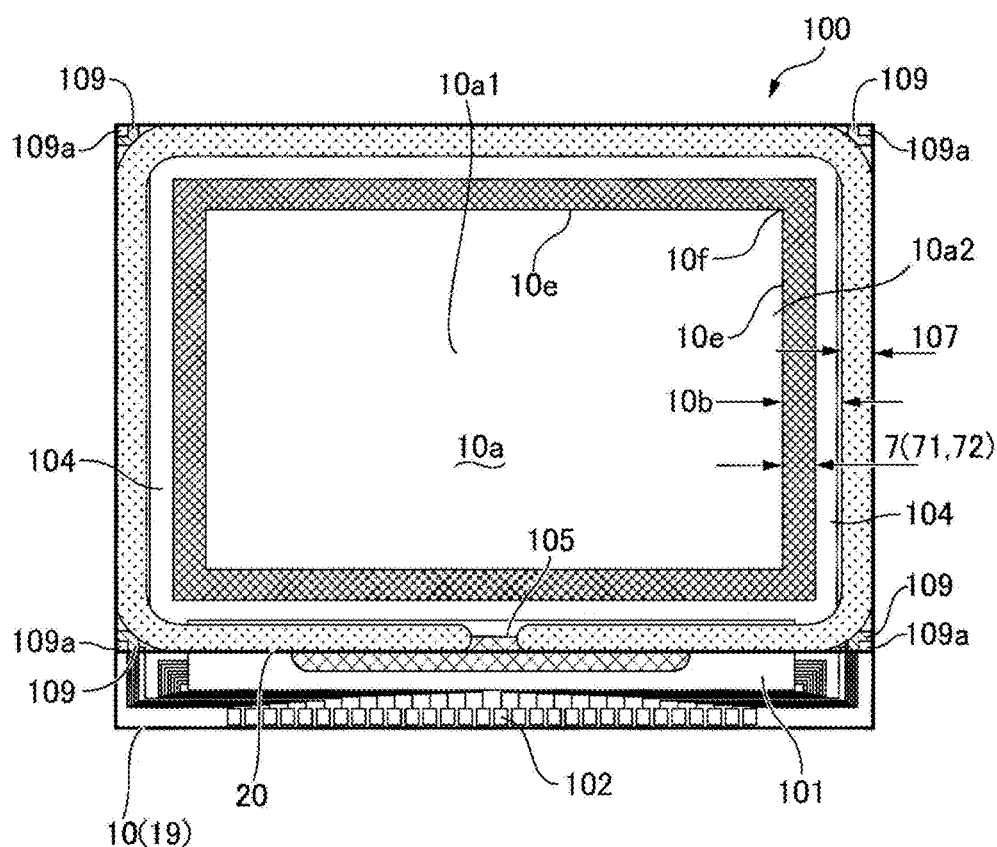
FIG. 1 is an explanatory diagram schematically illustrating a planar configuration of one aspect of an electro-optical device according to Exemplary Embodiment 1 of the present disclosure.

Exemplary embodiments of the present disclosure will be described below with reference to the drawings. Note that, in each of the figures to be referred to in the following description, to illustrate each layer, each member, and the like in a recognizable size in the drawings, each layer, each member, and the like are illustrated at a different scale.

Exemplary Embodiment 1

Configuration of Electro-Optical Device

Figure 2:
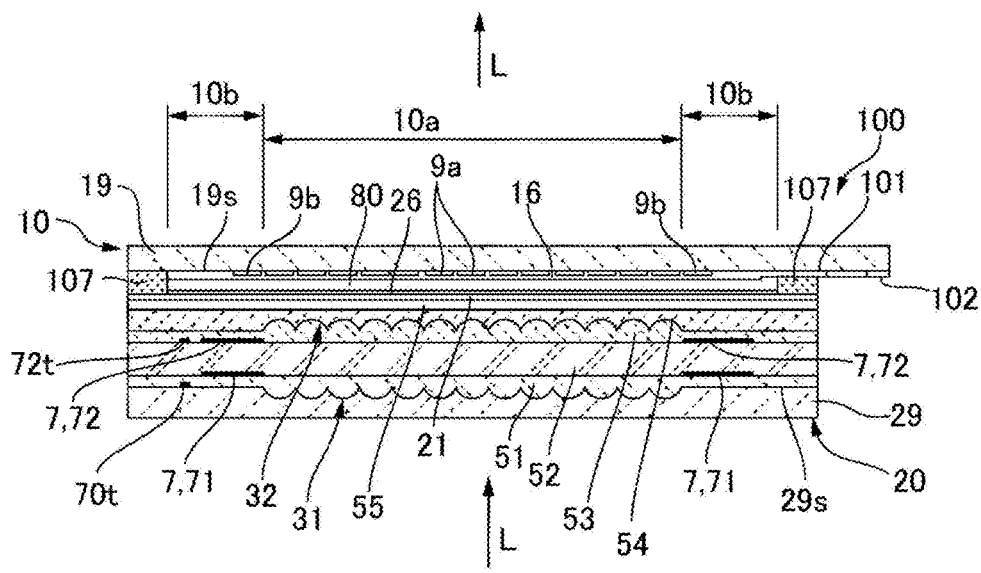
FIG. 2 is a cross-sectional view of the electro-optical device illustrated in FIG. 1.
Figure 3:
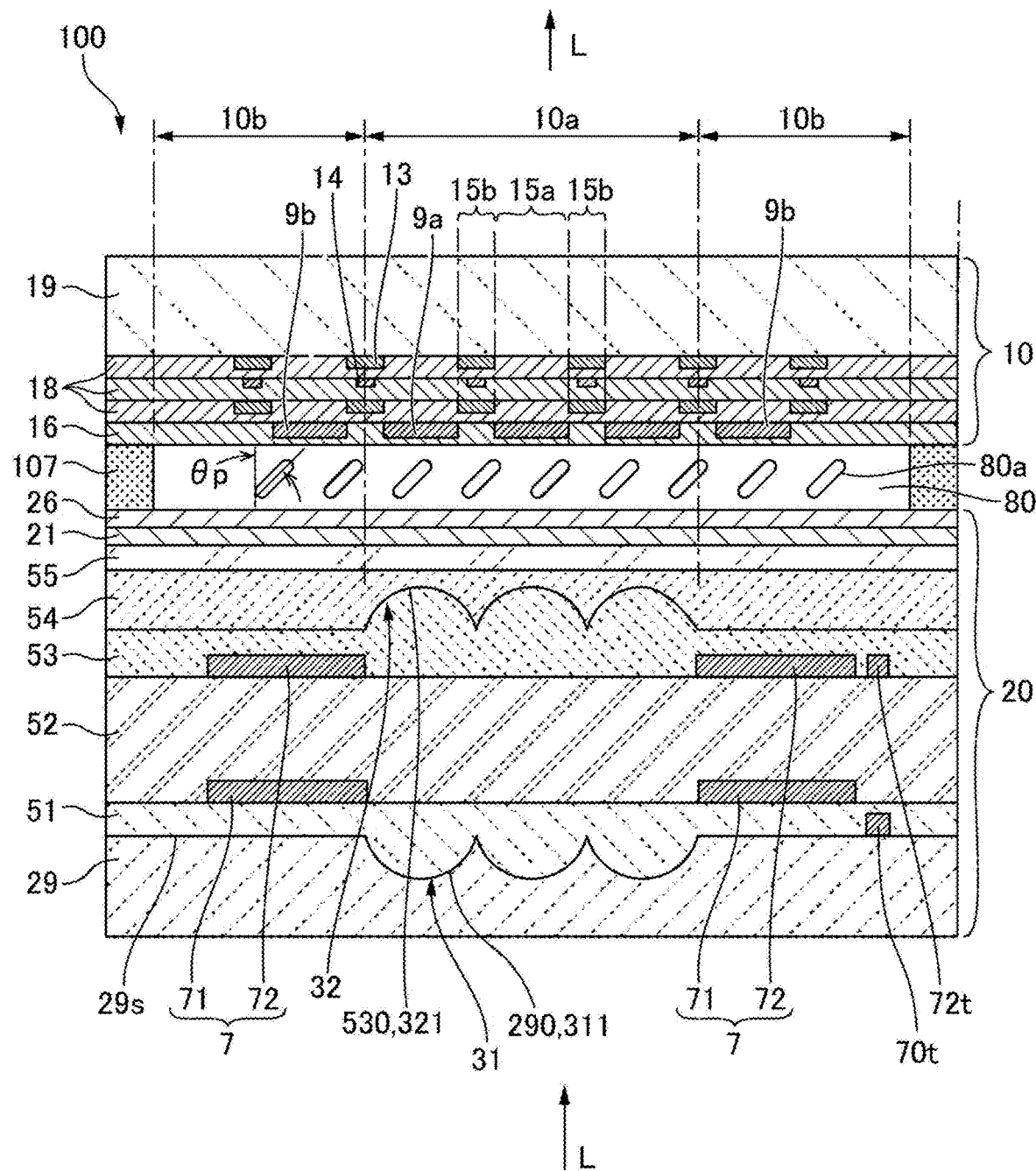
FIG. 3 is an enlarged explanatory diagram schematically illustrating a cross-sectional configuration of the electro-optical device illustrated in FIG. 1.

FIG. 1 is an explanatory diagram schematically illustrating a planar configuration of one aspect of an electro-optical device 100 according to Exemplary Embodiment 1 of the present disclosure. FIG. 1 illustrates a situation of the electro-optical device 100 together with each component when seen from a counter substrate side. FIG. 2 is a cross-sectional view of the electro-optical device illustrated in FIG. 1. FIG. 3 is an enlarged explanatory diagram schematically illustrating a cross-sectional configuration of the electro-optical device 100 illustrated in FIG. 1.

As illustrated in FIGS. 1, 2, and 3, in the electro-optical device 100, a first substrate 19 and a second substrate 20 are bonded together by a seal material 107 with a predetermined gap intervening therebetween, and a liquid crystal layer 80 is disposed in a region surrounded by the seal material 107 between the first substrate 19 and the second substrate 29. The seal material 107 is provided in a frame shape along an outer edge of the second substrate 29. The seal material 107 is a photocurable adhesive, or a photocurable and thermosetting adhesive, and a gap material such as glass fiber or glass beads for setting a distance between the substrates to a predetermined value is compounded in the seal material 107. The liquid crystal layer 80 is injected from an inlet 105 of the seal material 107, and then the inlet 105 is closed with an encapsulant. Note that when a liquid crystal material is filled by a dropping method, the inlet 105 does not need to be provided.

The first substrate 19 and the second substrate 29 are both a quadrangle, and in a substantially central portion of the electro-optical panel 100, a display region 10a is provided as a quadrangular region. Therefore, the display region 10a includes four sides 10e and four corners 10f. In accordance with such a shape, the seal material 107 is also provided in a quadrangular shape, and a peripheral region 10b having a rectangular frame shape is provided between an inner peripheral edge of the seal material 107 and an outer peripheral edge of the display region 10a.

At a surface 19s of the first substrate 19 at the second substrate 29 side, a data line driving circuit 101 and a plurality of terminals 102 are formed along one of the sides of the first substrate 19 outside the display region 10a, and a scanning line driving circuit 104 is formed along the other side adjacent to the one side. A flexible wiring substrate (not illustrated) is coupled to the terminals 102, and various potentials and various signals are input to the first substrate 19 via the flexible wiring substrate.

An element substrate 10 is constituted by forming, at the surface 19s of the first substrate 19, in the display region 10a, pixel electrodes 9a having a light-transmitting property formed of an Indium Tin Oxide (ITO) film and the like, and a pixel transistor (not illustrated) electrically coupled to each of the pixel electrodes 9a in a matrix shape. Further, a first alignment film 16 is formed at the second substrate 29 side with respect to the pixel electrodes 9a. Further, in the peripheral region 10b of the first substrate 19, dummy pixel electrodes 9b formed simultaneously with the pixel electrodes 9a are formed.

A counter substrate 20 is constituted by forming, at a surface 29s side of the second substrate 29 facing the first substrate 19, a common electrode 21 that has a light-transmitting property, is formed of an ITO film and the like, and faces the pixel electrodes 9a. A second alignment film 26 is formed at the first substrate 19 side with respect to the common electrode 21. In the exemplary embodiment, the common electrode 21 is formed over substantially the entire surface of the second substrate 29.

A partition 7 having a frame shape and extending along the outer edge of the display region 10a is formed in the second substrate 29 by a light shielding layer made of metal or a metal compound at the opposite side of the first substrate 19 with respect to the common electrode 21. A detailed configuration of the partition 7 is described later.

The first alignment film 16 and the second alignment film 26 are formed of a resin film such as polyimide or an oblique deposition film such as a silicon oxide film. In the exemplary embodiment, the first alignment film 16 and the second alignment film 26 are an inorganic alignment film (vertically alignment film) formed of an oblique deposition film such as $SiO_x$ (x<2), $SiO_2$, $TiO_2$, MgO, $Al_2O_3$, $In_2O_3$, $Sb_2O_3$, and $Ta_2O_5$, and cause the electro-optical device 100 to operate as a Vertical Alignment (VA) type liquid crystal device in a normally-black mode. The first alignment film 16 and the second alignment film 26 impart a pre-tilt of an angle θp (see FIG. 3) to liquid crystal molecules 80*a* having negative dielectric anisotropy used in the liquid crystal layer 80.

In the first substrate 19, an inter-substrate conduction electrode 109 is formed in a region positioning outside the seal material 107 and overlapping a corner portion of the second substrate 29, so that an electrical conduction is established between the first substrate 19 and the second substrate 29. An inter-substrate conduction material 109*a* including conductive particle is disposed in the inter-substrate conduction electrode 109. The common electrode 21 of the second substrate 29 is electrically coupled to the first substrate 19 side via the inter-substrate conduction material 109*a* and the inter-substrate conduction electrode 109. Therefore, a common potential is applied to the common electrode 21 from the first substrate 19 side.

In the electro-optical device 100 of the exemplary embodiment, the pixel electrodes 9*a* and the common electrode 21 are formed of a light-transmissive conductive film, and the electro-optical device 100 is constituted as a transmissive type liquid crystal device. In the electro-optical device 100, light incident from one of the first substrate 19 and the second substrate 29 is modulated while transmitting through the other substrate and being emitted. An image is thus displayed. In the exemplary embodiment, as indicated by the arrow L, light incident from the second substrate 29 is modulated by the liquid crystal layer 80 for each pixel while transmitting through the first substrate 19 and being emitted. An image is thus displayed.

Detailed Configuration of Counter Substrate 20

As illustrated in FIG. 3, a plurality of interlayer insulating films 18 are laminated at the first substrate 19. Wiring 13 and a pixel transistor 14 extending along a region overlapping between adjacent pixel electrodes 9*a* are formed between the first substrate 19 and the interlayer insulating film 18, between the interlayer insulating films 18, and the like, and the wiring 13 and the pixel transistor 14 do not transmit light.

Thus, in the first substrate 19, of regions overlapping the pixel electrodes 9*a* in plan view, a region overlapping the wiring 13 and the pixel transistor 14 in plan view is a light shielding region 15*b* that does not transmit light, and a region surrounded by the light shielding region 15*b* is an opening region 15*a* that transmits light. Therefore, only light transmitted through the opening region 15*a* contributes to display of an image, and light toward the light shielding region 15*b* does not contribute to display of an image.

Thus, a plurality of lenses that each overlap the plurality of respective pixel electrodes 9*a* in plan view are constituted in the second substrate 29, and each of the plurality of lens converges light from a light source to the opening region 15*a*. In the exemplary embodiment, in the second substrate 29, a first lens 31 located at an incident side of light, and a second lens 32 located at the first substrate 19 side with respect to the first lens 31 are constituted. Thus, in the electro-optical device 100, the first lens 31 and the second lens 32 converge light from the light source to the opening region 15*a*, and also collimate the light incident on the liquid crystal layer 80. Therefore, an inclination of an optical axis of the light incident on the liquid crystal layer 80 is small, and thus a phase shift at the liquid crystal layer 80 can be reduced, and a reduction in transmittance and contrast can be suppressed. Particularly in the exemplary embodiment, the electro-optical device 100 is constituted as a VA type liquid crystal device, and thus a reduction in contrast and the like are likely to occur due to the inclination of the optical axis of the light incident on the liquid crystal layer 80. However, according to the exemplary embodiment, a reduction in contrast and the like are less likely to occur.

In the exemplary embodiment, in constituting the first lens 31, a concave curved surface 290 is formed at the one surface 29*s* of the second substrate 29, and a first lens layer 51 having a light-transmitting property is laminated at the one surface 29*s* of the second substrate 29. The second substrate 29 and the first lens layer 51 differ in refractive index, and the concave curved surface 290 constitutes a lens surface 311 of the first lens 31. In the exemplary embodiment, the first lens layer 51 has a refractive index greater than a refractive index of the second substrate 29. For example, the second substrate 29 is formed of a quartz substrate (silicon oxide film, $SiO_2$), and has a refractive index of 1.48. The first lens layer 51 is formed of a silicon oxynitride film (SiON), and has a refractive index of from 1.58 to 1.68. Thus, the first lens 31 has power for converging light from a light source. Further, a first optical path length adjustment layer 52 formed of a silicon oxynitride film (SiON) is laminated at a surface of the first lens layer 51 opposite to the second substrate 29.

In constituting the second lens 32, a second lens layer 53 is formed at a surface of the first optical path length adjustment layer 52 opposite to the second substrate 29, and a convex curved surface 530 is formed at a surface of the second lens layer 53 opposite to the second substrate 29. A second optical path length adjustment layer 54 is laminated at the surface of the second lens layer 53 opposite to the second substrate 29. The second lens layer 53 and the second optical path length adjustment layer 54 differ in refractive index, and the convex curved surface 530 constitutes a lens surface 321 of the second lens 32. In the exemplary embodiment, the second lens layer 53 has a refractive index greater than that of the second optical path length adjustment layer 54. For example, the second lens layer 53 is formed of a silicon oxynitride film, and has a refractive index of from 1.58 to 1.68. The second optical path length adjusting layer 54 is formed of a silicon oxide film (SiOx), and has a refractive index of 1.48. Thus, the second lens 32 has power for converging light emitted from the first lens 31. In the exemplary embodiment, for example, the second lens layer 53 has a film thickness of 7 μm of a portion where the convex curved surface 530 is formed, and the convex curved surface 530 has a height of 2.5 μm. Therefore, the second lens layer 53 has a film thickness of 4.5 μm of a portion where the convex curved surface 530 is not formed.

A protective layer 55 such as a silicon oxide film ($SiO_2$) is formed at a surface of the second optical path length adjustment layer 54 opposite to the second substrate 29, and the common electrode 21 is formed at the opposite side of the second substrate 29 with respect to the protective layer 55. The second alignment film 26 is formed at the opposite side of the second substrate 29 with respect to the common electrode 21.

Here, the first optical path length adjustment layer 52 has a film thickness greater than or equal to a film thickness of the second optical path length adjustment layer 54. In the exemplary embodiment, the first optical path length adjustment layer 52 has a film thickness of from 10 μm to 12 μm, and a sum of the film thickness of the first optical path length adjustment layer 52 and the film thickness of the protective layer 55 is 12 µm.

Configuration of Partition 7 and the Like

Figure 4:
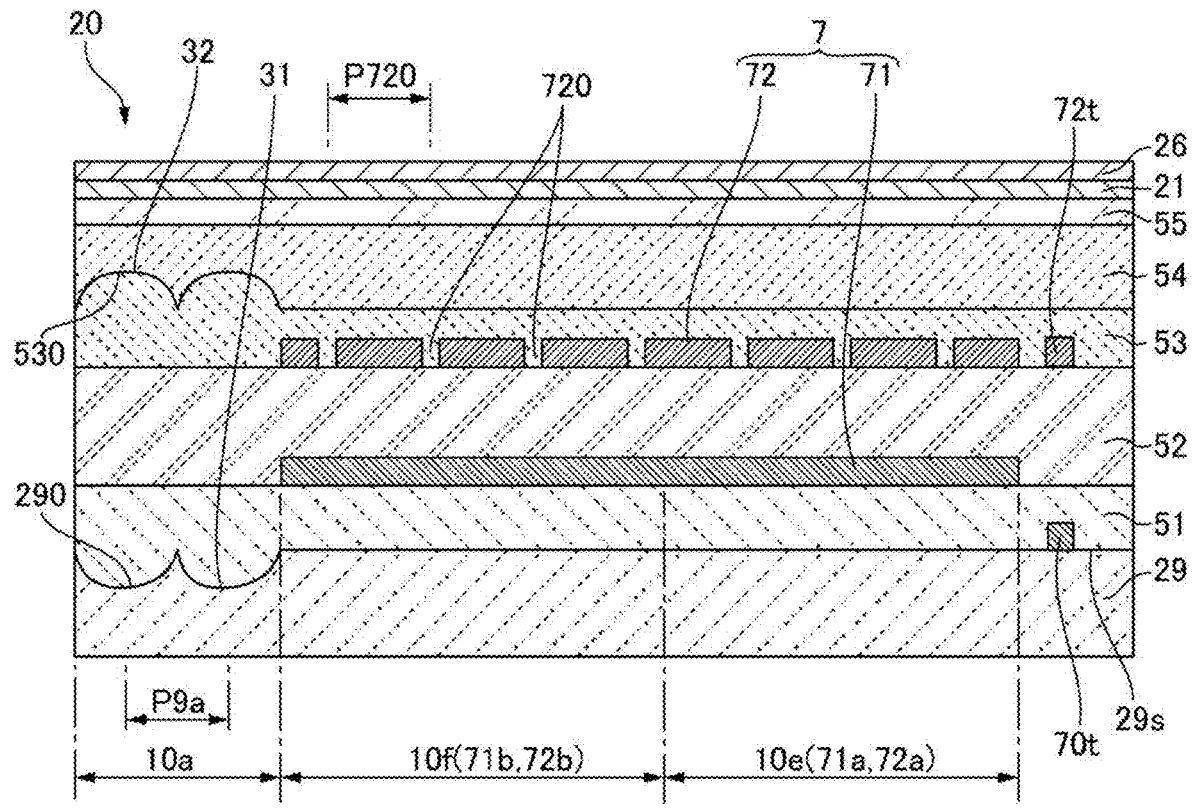
FIG. 4 is an explanatory diagram schematically illustrating a cross-sectional configuration of a partition of the electro-optical device illustrated in FIG. 1.

FIG. 4 is an explanatory diagram schematically illustrating a cross-sectional configuration of a partition 7 of the electro-optical device 100 illustrated in FIG. 1. FIG. 4 illustrates that a first partition portion 71 and a second partition portion 72 include portions 71a and 72a extending along the side 10e of the display region 10a, and portions 71b and 72b extending along the corner 10f of the display region 10a.

As illustrated in FIGS. 3 and 4, the second substrate 29 is provided with the first lens 31 overlapping the pixel electrodes 9a in plan view between the second substrate 29 and the common electrode 21, and the first optical path length adjustment layer 52 provided between the first lens 31 and the common electrode 21. Further, the second substrate 29 is provided with the second lens 32 overlapping the first lens 31 in plan view between the first optical path length adjustment layer 52 and the common electrode 21, and the second optical path length adjustment layer 54 provided between the second lens 32 and the common electrode 21.

In the exemplary embodiment, the first partition portion 71 that has a light shielding property, is made of a metal or a metal compound, and extends along the outer edge of the display region 10a is provided between the first lens 31 and the first optical path length adjustment layer 52. More specifically, the first partition portion 71 is provided between the first lens layer 51 and the first optical path length adjustment layer 52. Further, the second partition portion 72 that has a light shielding property, is made of a metal or a metal compound, and extends along the outer edge of the display region 10a is provided between the first optical path length adjustment layer 52 and the second lens 32. More specifically, the second partition portion 72 is provided between the first optical path length adjustment layer 52 and the second lens layer 53.

The first partition portion 71 and the second partition portion 72 overlap each other in plan view, and constitute the partition 7 illustrated in FIG. 1. Note that a first alignment mark 70t having a light shielding property made of a metal or a metal compound is provided between the second substrate 29 and the first lens layer 51. Further, a second alignment mark 72t having a light shielding property is provided between the first optical path length adjustment layer 52 and the second lens layer 53. The second alignment mark 72t is made of a metal or a metal compound formed simultaneously with the second partition portion 72.

Note that when a mother substrate, in a state where many second substrates 29 can be obtained from the mother substrate, is formed up to the second alignment film 26 and is divided into a plurality of second substrates 29, the first alignment mark 70t and the second alignment mark 72t may be formed in a region of the mother substrate other than a region being divided as the second substrate 29. In this case, the first alignment mark 70t and the second alignment mark 72t are not left in the second substrate 29.

In the exemplary embodiment, the first partition portion 71, the second partition portion 72, and the first alignment mark 70t are each formed of a metal film such as titanium (Ti), aluminum (Al), chromium (Cr), tungsten (W), Ttantalum (Ta), molybdenum (Mo), and palladium (Pd), or a metal compound film such as a nitride film thereof. Further, the first partition portion 71, the second partition portion 72, and the first alignment mark 70t may be each a multilayer film of the metal film or the metal compound film described above. In the exemplary embodiment, all of the first partition portion 71, the second partition portion 72, and the first alignment mark 70t have a structure in which an aluminum film is laminated to a titanium film at the opposite side of the second substrate 29.

Detailed Configuration of First Partition Portion 71 and Second Partition Portion 72

As illustrated in FIG. 4, in the electro-optical device 100 according to the exemplary embodiment, the second partition portion 72 is provided with a plurality of first openings 720, which are bored through the second partition portion 72, along the outer edge of the display region 10a in the entire extending direction of the second partition portion 72. The inside of the first opening 720 is a penetration portion through which the second lens layer 53 reaches the first optical path length adjustment layer 52.

In contrast, an opening is not formed in the first partition portion 71. Thus, even when the plurality of first openings 720 are provided in the second partition portion 72, a characteristic as the partition 7 does not deteriorate.

In the exemplary embodiment, the plurality of first openings 720 are provided at the same pitch in both the portion 72a extending along the side 10e of the display region 10a and the portion 72b extending along the corner 10f of the display region 10a. Thus, the plurality of first openings 720 are provided at a constant density across the entire region of the second partition portion 72. Further, a pitch P720 of the plurality of first openings 720 is the same or substantially the same as a pitch P9a of the pixel electrodes 9a (a pitch of the first lens 31 and a pitch of the second lens 32). An opening ratio of the first openings 720 in the second partition portion 72 is greater than or equal to 15%.

Here, the first opening 720 is formed in a dot shape having a circular or angular opening, but the first opening 720 may have a slit shape.

Method for Manufacturing Counter Substrate 20

A method for manufacturing the counter substrate 20 is described with reference to FIG. 4 and the like. When the counter substrate 20 is manufactured, a mother substrate formed of a quartz substrate larger than the second substrate 29 is used. However, in the following description, the second substrate 29 is described without differentiating between the second substrate 29 of a single size and the mother substrate.

In manufacturing the counter substrate 20, as illustrated in FIG. 4, a light-shielding layer is formed at the one surface 29s of the second substrate 29 by a sputtering method or the like and then patterned, and the first alignment mark 70t is formed.

Next, an exposure mask or the like is aligned with reference to the first alignment mark 70t, and the plurality of concave curved surfaces 290 are formed at the one surface 29s of the second substrate 29. For example, after an etching mask, which includes a region overlapping the center of the concave curved surface 290 in plan view being an opening, is formed at the first surface 29s of the second substrate 29 by using a photolithography technique, isotropic etching is performed by using an etching solution containing a hydrofluoric acid, and the concave curved surface 290 is formed.

Next, the first lens layer 51 formed of a silicon oxynitride film is formed by a plasma Chemical Vapor Deposition (CVD) method in a condition of a substrate temperature of from 200° C. to 250° C., and then a surface of the first lens layer 51 is planarized by using Chemical Mechanical Polishing (CMP) processing or the like.

Next, a light-shielding layer is formed at the surface of the first lens layer 51 by a sputtering method or the like and then patterned, and the first partition portion 71 is formed.

Next, the first optical path length adjustment layer 52 formed of a silicon oxynitride film is formed by the plasma CVD method in a condition of a substrate temperature of from 200° C. to 250° C., and then a surface of the first optical path length adjustment layer 52 is planarized by using the CMP processing or the like.

Next, after a light-shielding layer is formed at the surface of the first optical path length adjustment layer 52 by a sputtering method or the like and then patterned, and the second partition portion 72 and the second alignment mark 72t are formed. At this time, the first opening 720 is formed in the second partition portion 72.

Next, the second lens layer 53 formed of a silicon oxynitride film is formed by the plasma CVD method in a condition of a substrate temperature of from 200° C. to 250° C.

Next, an exposure mask or the like is aligned with reference to the second alignment mark 72t, and the plurality of convex curved surfaces 530 are formed at the surface of the second lens layer 53. For example, after a hemispherical photosensitive resin is formed at the surface of the second lens layer 53 by using a mask photolithography technique or the like using a grayscale, the photosensitive resin and the surface of the second lens layer 53 is etched by dry etching using an Inductively Coupled Plasma (ICP) device or the like, and the plurality of convex curved surfaces 530 are formed.

Next, the second optical path length adjustment layer 54 formed of a silicon oxynitride film is formed by the plasma CVD method in a condition of a substrate temperature of from 200° C. to 250° C., and then the second optical path length adjustment layer 54 is planarized by using the CMP processing or the like.

Next, the protective layer 55 formed of a silicon oxide film (SiOx) is formed by the plasma CVD method in a condition of a substrate temperature of from 200° C. to 250° C.

Next, after the common electrode 21 is formed, the second alignment film 26 is formed. When the common electrode 21 is formed, an ITO film is formed by, for example, a sputtering method in a condition of a substrate temperature of 300° C., and the common electrode 21 is formed.

Subsequently, the mother substrate is divided into the plurality of counter substrates 20 of a single size, and then the electro-optical device 100 is manufactured by using the counter substrate 20.

Main Effects of Exemplary Embodiment

Figure 5A:
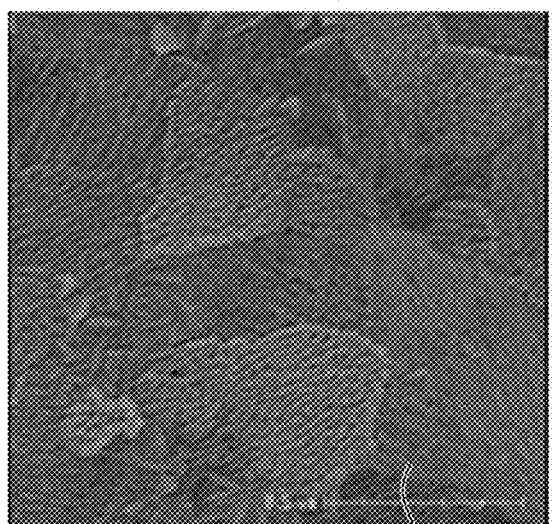
FIGS. 5A and 5B are explanatory diagrams of a result of observing, with an electron microscope, a common electrode of the electro-optical device illustrated in FIG. 1.
Figure 5B:
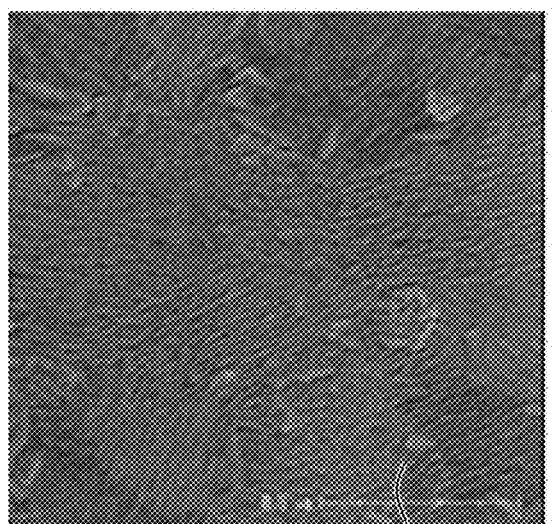
Figure 6:
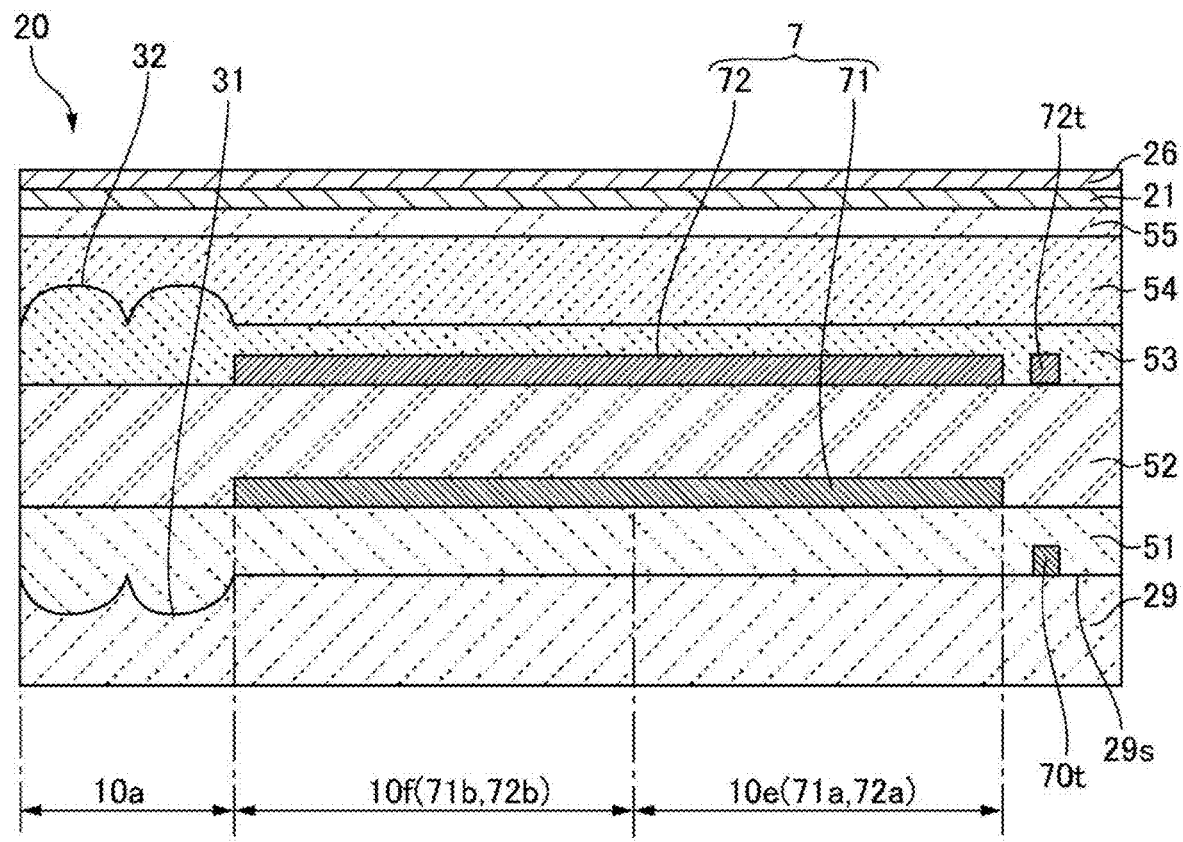
FIG. 6 is an explanatory diagram of an electro-optical device according to a reference example of the present disclosure.
Figure 7A:
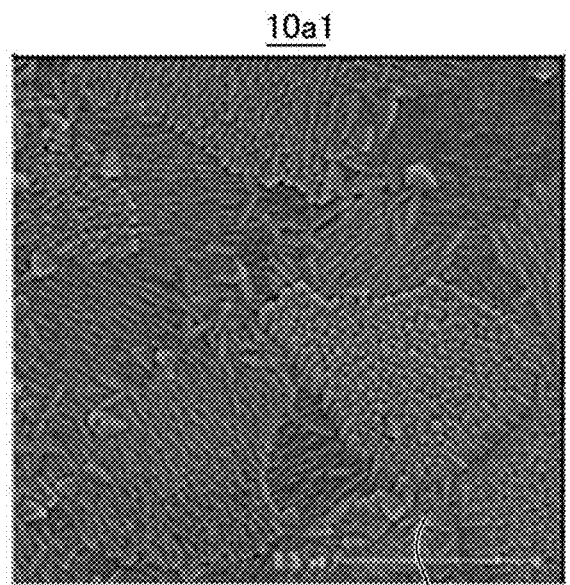
FIGS. 7A and 7B are explanatory diagrams of a result of observing, with an electron microscope, a common electrode of the electro-optical device illustrated in FIG. 6.
Figure 7B:
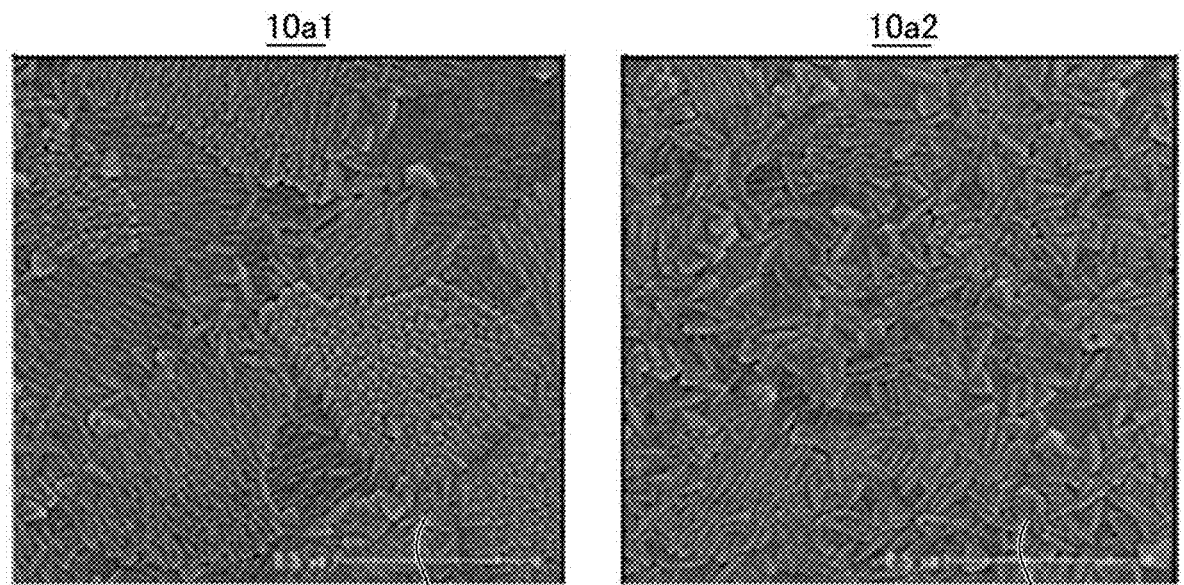

FIGS. 5A and 5B are explanatory diagrams of a result of observing, with an electron microscope, the common electrode 21 of the electro-optical device 100 illustrated in FIG. 1. FIGS. 5A and 5B illustrate a result of observing the common electrode 21 in the center 10a1 of the display region 10a as 5A, and a result of observing the common electrode 21 of an end portion 10a2 of the display region 10a as 5B. FIG. 6 is an explanatory diagram of an electro-optical device according to a reference example of the present disclosure. FIGS. 7A and 7B are explanatory diagrams of a result of observing, with an electron microscope, a common electrode of the electro-optical device illustrated in FIG. 6. FIGS. 7A and 7B illustrate the result of observing a common electrode 21 in the center 10a1 of a display region 10a, and the result of observing the common electrode 21 of an end portion 10a2 of the display region 10a, respectively.

In the electro-optical device 100 having the configuration described above, the second partition portion 72 is provided with the plurality of first openings 720, which are bored through the second partition portion 72, along the outer edge of the display region 10a in the entire extending direction of the second partition portion 72. Thus, when the ITO film constituting the common electrode 21 is formed in a condition where the substrate temperature is increased, the ITO film can also be formed in a region where the first optical path length adjustment layer 52 is covered by the second partition portion 72 and in the vicinity thereof in a condition similar to that of the center 10a1 of the display region 10a where the first optical path length adjustment layer 52 is not covered by the second partition portion 72. Therefore, even at the end portion 10a2 near the partition 7 (the first partition portion 71 and the second partition portion 72) in the display region 10a, a problem of an image being unnaturally brighter than the other region does not occur, and a high-quality image can be displayed.

The reason for this is considered as follows. First, the substrate temperature in forming the common electrode 21 is, for example, 300° C., and is higher than the substrate temperature (200° C. to 250° C.) in forming the first lens layer 51, the first optical path length adjustment layer 52, the second lens layer 53, the second optical path length adjustment layer 54, the protective layer 55, and the like. Further, the first optical path length adjustment layer 52 has a thick film thickness. Further, the first optical path length adjustment layer 52 is formed of a silicon oxynitride film (SiON). Thus, when the substrate temperature is increased to 300° C. in the film formation of the common electrode 21, nitrogen gas and the like are generated in the first optical path length adjustment layer 52. Even in such a case, in the exemplary embodiment, the plurality of first openings 720 are formed in the second partition portion 72. Thus, similar to the center 10a1 and the like, nitrogen gas and the like are also appropriately discharged at the end portion 10a2 in the vicinity of the second partition portion 72 in the display region 10a without the nitrogen gas and the like being blocked by the second partition portion 72. Therefore, in the display region 10a, the ITO film is also formed at the end portion 10a2 in a condition similar to that of the center 10a1 and the like.

Thus, when the ITO film is observed with an electron microscope, the crystallinity of the ITO film is appropriate in both the ITO film in the center 10a1 and the ITO film of the end portion 10a2. Thus, the second alignment film 26 can be formed appropriately across the entire display region 10a, and thus the alignment and the like of the liquid crystal molecules 80a are not disturbed. For example, in the VA type electro-optical device 100 in the normally-black mode, a situation in which a pre-tilted angle (angle θp) of the liquid crystal molecules 80a is greater at the end portion 10a2 of the display region 10a than in the center 10a1 of the display region 10a is less likely to occur. Thus, even at the end portion 10a2 near the partition (the first partition portion 71 and the second partition portion 72) in the display region 10a, occurrence of a light leakage and the like can be suppressed, and thus a problem of an image being unnaturally brighter at the end portion 10a2 than in the center 10a1 of the display region 10a is less likely to occur.

In contrast, as illustrated in FIG. 6, when the first opening 720 described with reference to FIG. 4 is not provided, nitrogen gas and the like generated in a first optical path length adjustment layer 52 are blocked by a second partition portion 72 at the end portion 10a2 in the vicinity of the second partition portion 72, unlike the center 10a1. In the display region 10a, an ITO film is formed in different conditions in the center 10a1 and at the end portion 10a2. Thus, when the ITO film is observed with an electron microscope, as illustrated in FIGS. 7A and 7B, the crystallinity of the ITO film in the center 10a1 is fine, but the crystallinity of the ITO film at the end portion 10a2 is rough. Thus, it is considered that alignment of liquid crystal molecules is disturbed due to a disturbance of a structure of a second alignment film 26 at the end portion 10a2 of the display region 10a, and a light leakage occurs.

MODIFIED EXAMPLE OF EXEMPLARY EMBODIMENT 1

Figure 8:
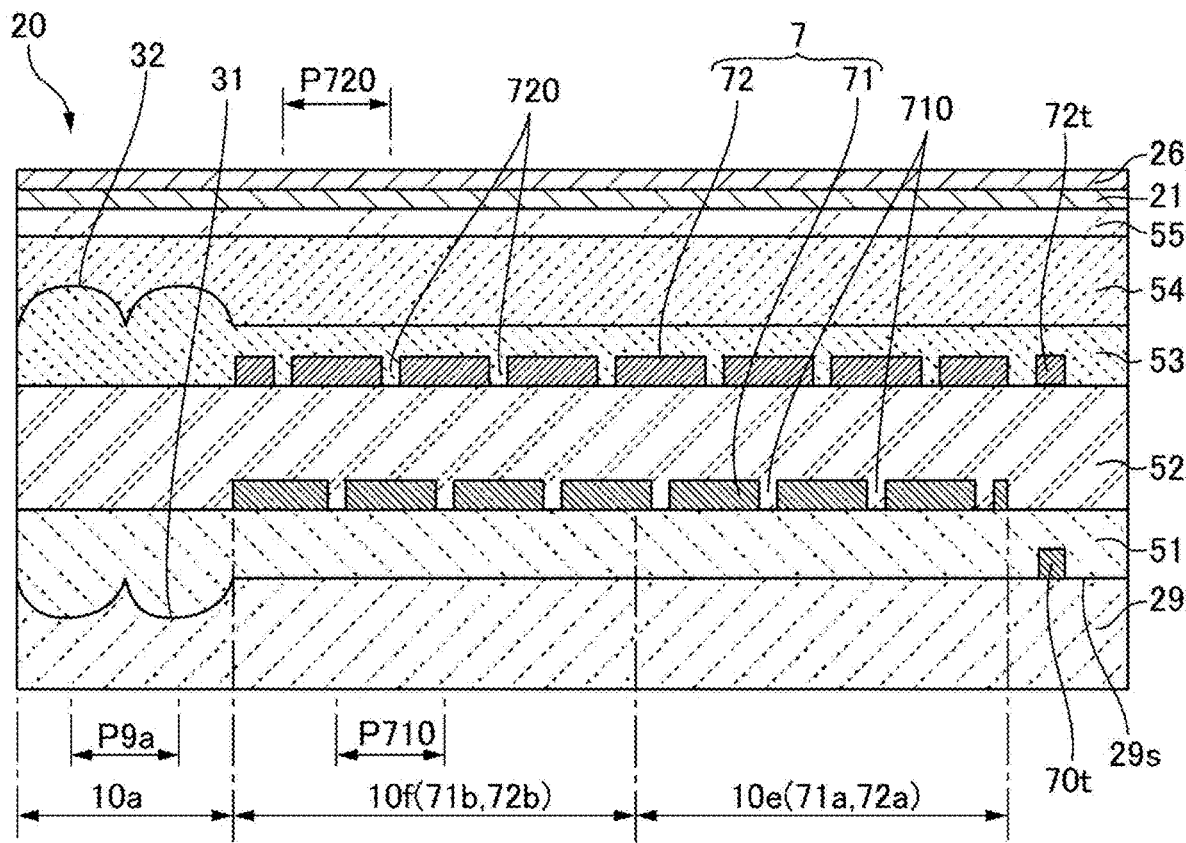
FIG. 8 is an explanatory diagram of an electro-optical device according to a modified example of Exemplary Embodiment 1 of the present disclosure.

FIG. 8 is an explanatory diagram of an electro-optical device 100 according to a modified example of Exemplary Embodiment 1 of the present disclosure, and schematically illustrates a cross-sectional configuration of a partition 7. Note that the basic configuration of both this example and exemplary embodiments described below is the same as the configuration of Exemplary Embodiment 1, and thus corresponding portions have the same reference signs and description of the corresponding portions will be omitted.

As illustrated in FIG. 8, also in the electro-optical device 100 according to the exemplary embodiment, similar to Exemplary Embodiment 1, a second partition portion 72 is provided with a plurality of first openings 720, which are bored through the second partition portion 72, along an outer edge of a display region 10a in the entire extending direction of the second partition portion 72. The inside of the first opening 720 is a penetration portion through which a second lens layer 53 reaches a first optical path length adjustment layer 52.

Further, a first partition portion 71 also is provided with a plurality of second openings 710, which are bored through the first partition portion 71, along the outer edge of the display region 10a in the entire extending direction of the first partition portion 71. The inside of the second opening 710 is a penetration portion through which the first optical path length adjustment layer 52 reaches a first lens layer 51.

In the exemplary embodiment, the plurality of first openings 720 are provided at the same pitch in both a portion 72a extending along a side 10e of the display region 10a and a portion 72b extending along a corner 10f of the display region 10a. Further, the plurality of second openings 710 are provided at the same pitch in both a portion 71a extending along the side 10e of the display region 10a and a portion 71b extending along the corner 10f of the display region 10a. Thus, the plurality of first openings 720 are provided at a constant density across the entire region of the second partition portion 72, and the plurality of second openings 710 are provided at a constant density across the entire region of the first partition portion 71. Further, a pitch P720 of the plurality of first openings 720 is the same or substantially the same as a pitch P9a of pixel electrodes 9a, and a pitch P710 of the plurality of second openings 710 is the same or substantially the same as the pitch P9a of the pixel electrodes 9a. Further, an opening ratio of the first openings 720 in the second partition portion 72 is greater than or equal to 15%, and an opening ratio of the second openings 710 in the first partition portion 71 is greater than or equal to 15%.

According to this aspect, the plurality of first openings 720 are provided in the second partition portion 72, and thus the same effect as that of Exemplary Embodiment 1 is achieved. Further, the plurality of second openings 710 are provided in the first partition portion 71, and thus when a substrate temperature is heated to 300° C. in film formation of a common electrode 21, nitrogen gas and the like generated in the first lens layer 51 are released from the second openings 710 of the first partition portion 71 and are less likely to affect film formation of an ITO film.

Here, the second opening 710 is provided in a position shifted in plan view with respect to the first opening 720. Thus, even when the plurality of first openings 720 are provided in the second partition portion 72, and the plurality of second openings 710 are provided in the first partition portion 71, a characteristic as the partition 7 does not deteriorate.

EXEMPLARY EMBODIMENT 2

Figure 9:
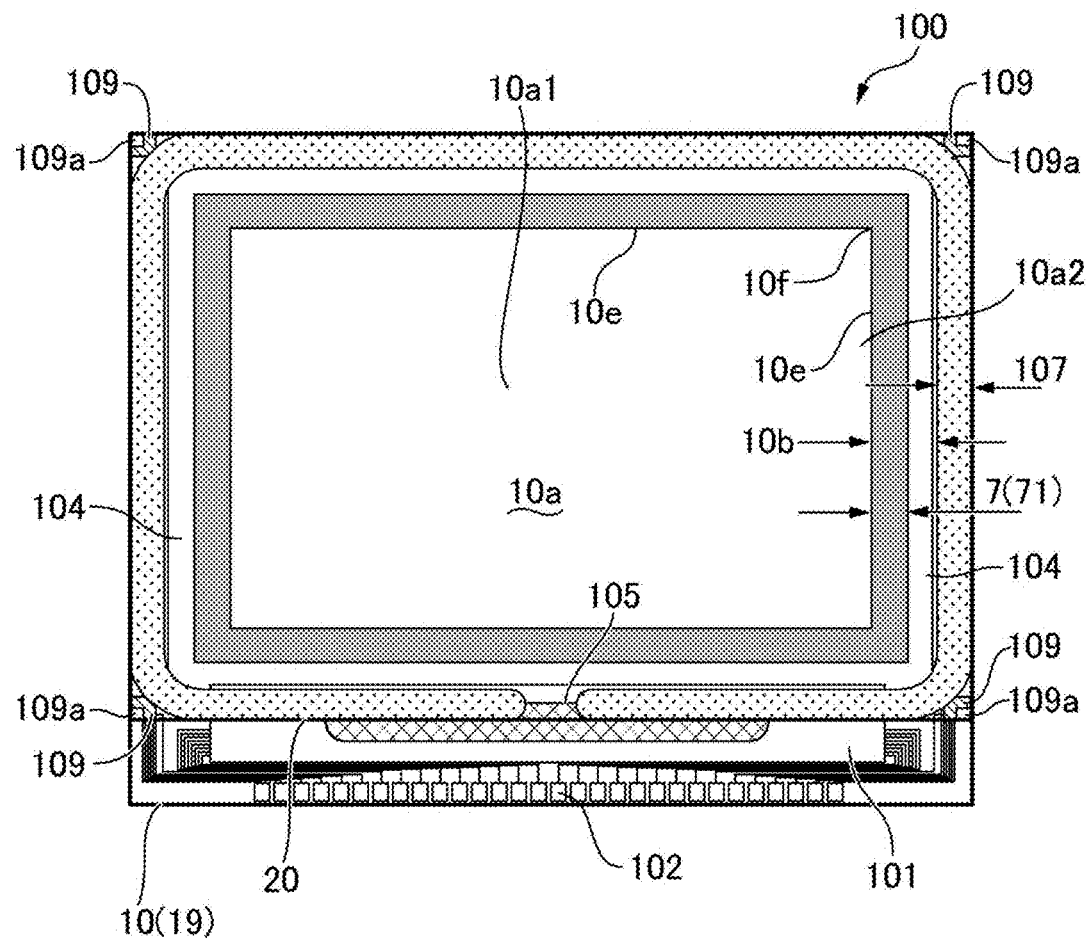
FIG. 9 is an explanatory diagram schematically illustrating a planar configuration of an electro-optical device according to Exemplary Embodiment 2 of the present disclosure.
Figure 10:
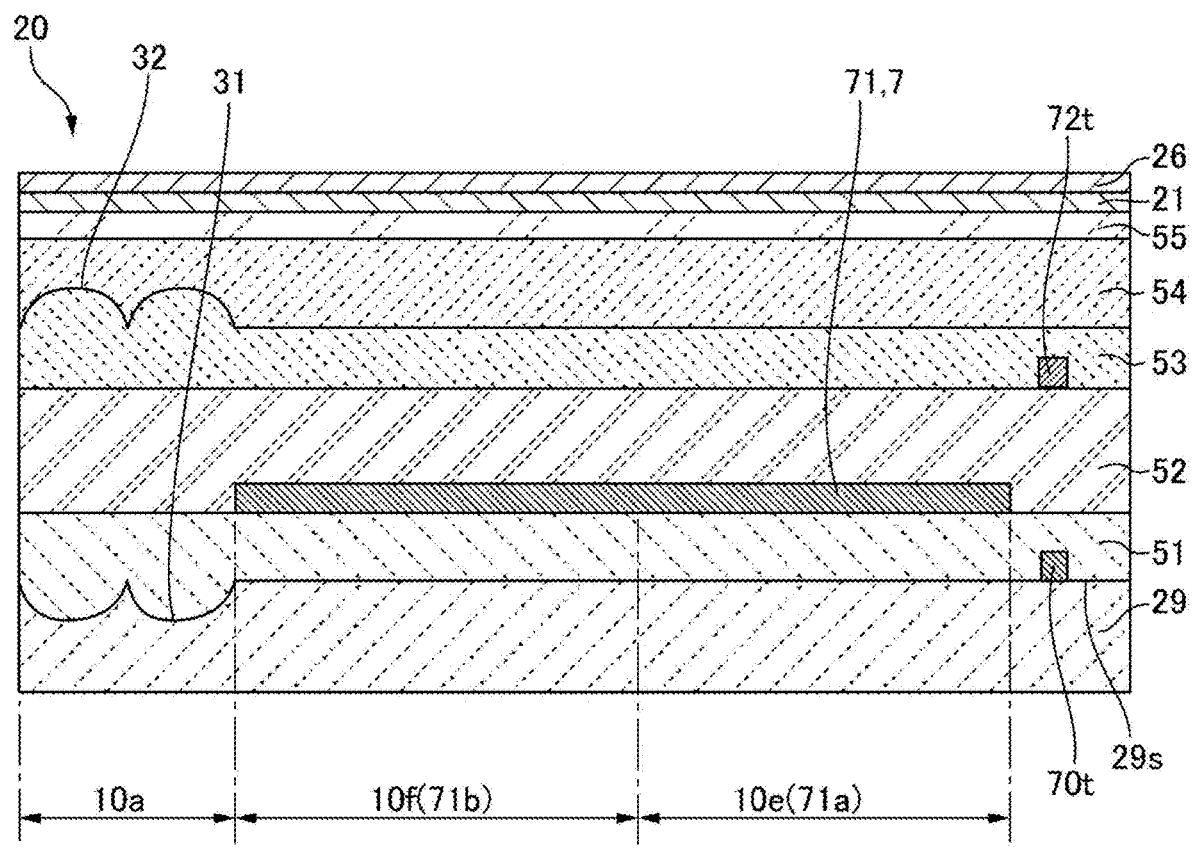
FIG. 10 is an explanatory diagram illustrating a partition illustrated in FIG. 9.

FIG. 9 is an explanatory diagram schematically illustrating a planar configuration of an electro-optical device 100 according to Exemplary Embodiment 2 of the present disclosure. FIG. 10 is an explanatory diagram of a partition 7 illustrated in FIG. 9. As illustrated in FIGS. 9 and 10, in the exemplary embodiment, of portions between a first lens 31 and a first optical path length adjustment layer 52 and between the first optical path length adjustment layer 52 and a second lens 32, a partition portion (first partition portion 71) extending along an outer edge of a display region 10a is provided only between the first lens 31 and the first optical path length adjustment layer 52, and a second partition portion 72 is not provided. Further, the first partition portion 71 is not provided with an opening (second opening 710) described with reference to FIG. 8 and the like.

Also, in this case, when a substrate temperature is increased to 300° C. in order to form a common electrode 21, nitrogen gas and the like generated in the first optical path length adjustment layer 52 are appropriately discharged even at an end portion 10a2 of the display region 10a, similar to the center 10a1 and the like. Thus, in the display region 10a, the same effect as that in Exemplary Embodiment 1 is achieved in such a way that an ITO film is also formed at the end portion 10a2 in a condition similar to that of the center 10a1 and the like.

EXEMPLARY EMBODIMENT 3

Figure 11:
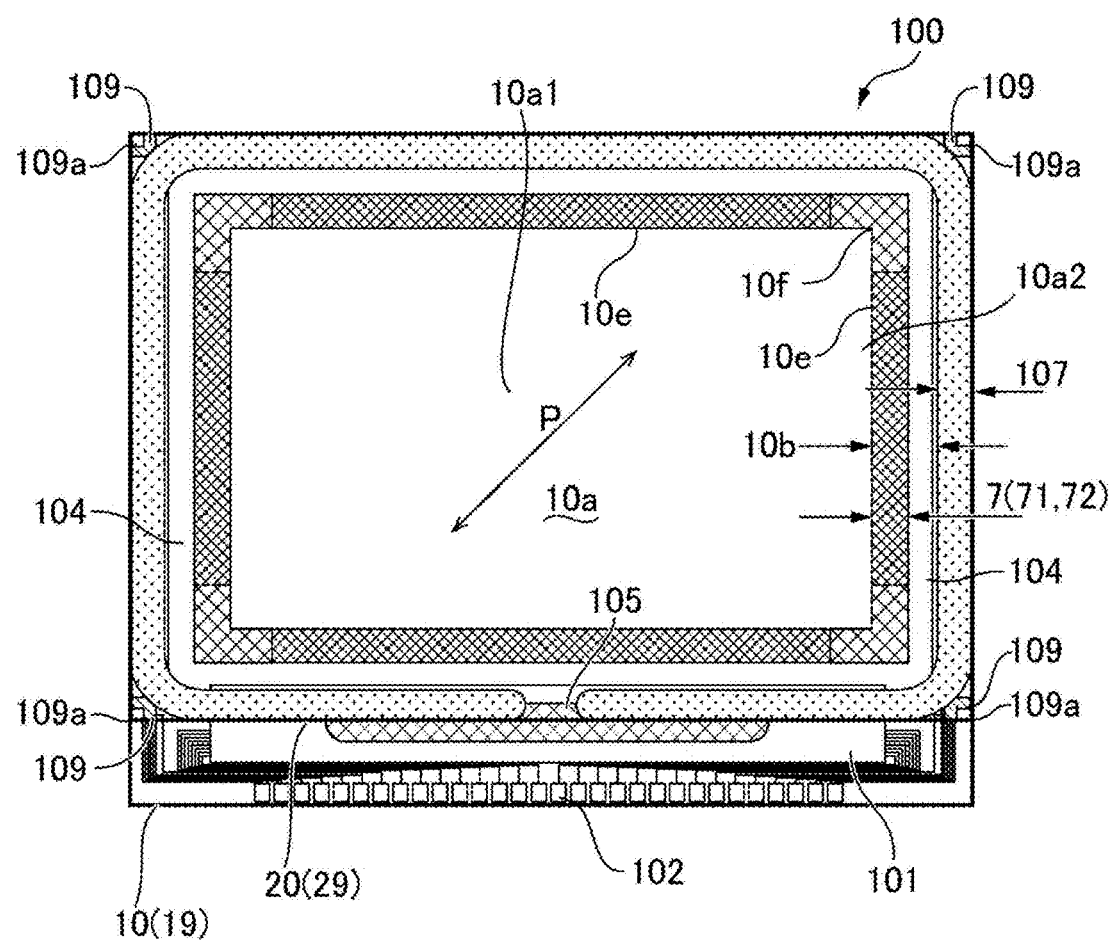
FIG. 11 is an explanatory diagram schematically illustrating a planar configuration of an electro-optical device according to Exemplary Embodiment 3 of the present disclosure.
Figure 12:
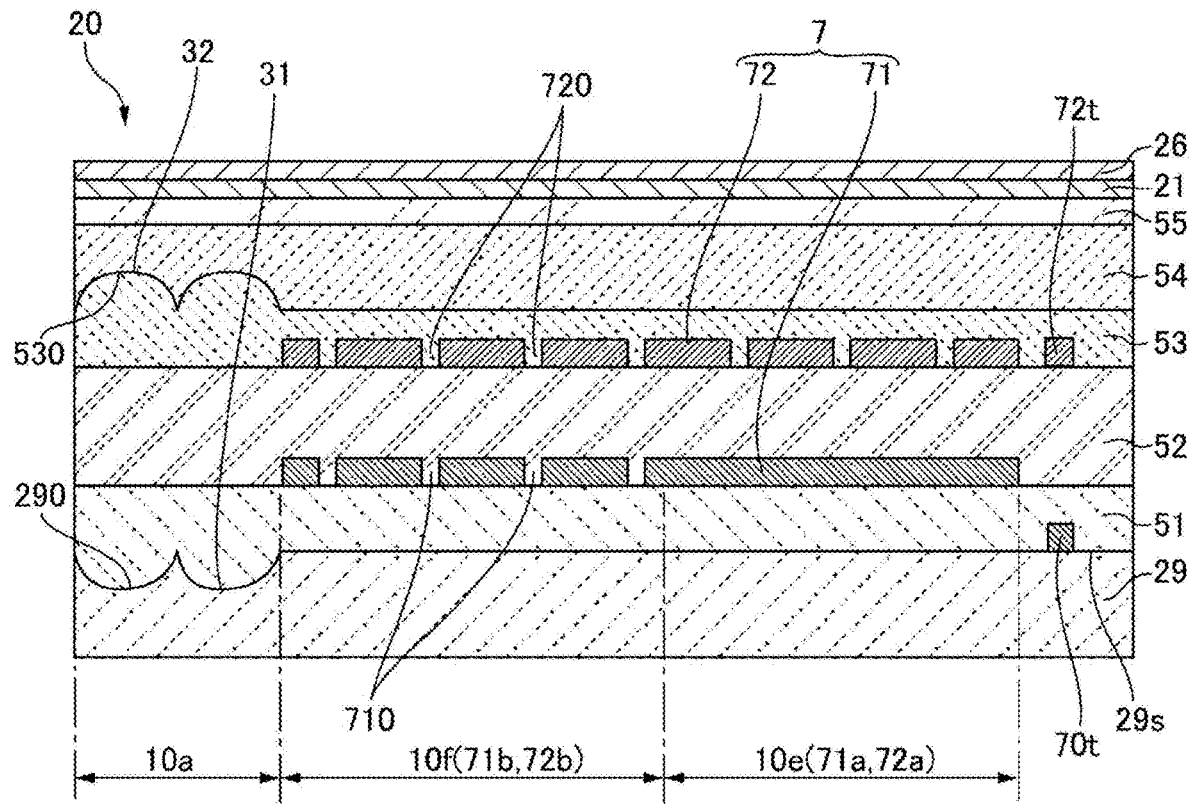
FIG. 12 is an explanatory diagram of a partition illustrated in FIG. 11.

FIG. 11 is an explanatory diagram schematically illustrating a planar configuration of an electro-optical device 100 according to Exemplary Embodiment 3 of the present disclosure. FIG. 12 is an explanatory diagram of a partition 7 illustrated in FIG. 11. As illustrated in FIGS. 11 and 12, also in the exemplary embodiment, similar to Exemplary Embodiment 1, a first partition portion 71 extending along an outer edge of a display region 10a is provided between a first lens 31 and a first optical path length adjustment layer 52, and a second partition portion 72 extending along the outer edge of the display region 10a is provided between the first optical path length adjustment layer 52 and a second lens 32.

The second partition portion 72 is provided with a plurality of first openings 720, which are bored through the second partition portion 72, along the outer edge of the display region 10a in the entire extending direction of the second partition portion 72. Therefore, the same effect as that in Exemplary Embodiment 1 is achieved.

In the exemplary embodiment, in the first partition portion 71, a second opening 710 is formed in a portion 71b extending along a corner 10f of the display region 10a, and the second opening 710 is not formed in a portion 71a extending along a side 10e of the display region 10a. Here, the second opening 710 formed in the first partition portion 71 overlaps the first opening 720 formed in the second partition portion 72 in plan view. Therefore, light incident from a second substrate 29 side transmits through the first opening 720 and the second opening 710, and reaches a liquid crystal layer 80. Therefore, the following effect is achieved.

In FIG. 3, the electro-optical device 100 displays an image by causing light source light to be incident from the second substrate 29 side and also changing a posture of the liquid crystal molecules 80a by a voltage between the pixel electrodes 9a and the common electrode 21. At this time, as the posture of the liquid crystal molecules 80a changes, impurities mixed in when the liquid crystal layer 80 is filled or impurities eluted from the seal material 107 move toward the side in the display region 10a on which the liquid crystal molecules 80a are aligned, and condense. Here, a location where the impurities are more likely to be concentrated is a portion having a long distance in a direction in which the liquid crystal molecules 80a are aligned (the direction in which the impurities move) in the display region 10a. In the exemplary embodiment, a location where the impurities are more likely to be concentrated is in the vicinity of the two corners 10f located diagonally at the side where the liquid crystal molecules 80a are aligned (the side indicated by an arrow P in FIG. 11). According to the aspect, in the exemplary embodiment, in the first partition portion 71 and the second partition portion 72, a portion located outside the corner 10f is made to be a light transmission region by the first opening 720 and the second opening 710. Thus, light incident from the second substrate 29 side reaches the liquid crystal layer 80 outside the two corners 10f, and thus the impurities move to a position spaced outward from the corner 10f of the display region 10a, while remaining in a state of being activated by light, without stagnating, and then coagulate in the position. Thus, a reduction in display quality such as image sticking (stain) due to the coagulated impurities is less likely to occur.

Even when such a configuration is adopted, the second opening 710 is not formed in the portion 71a extending along the side 10e of the display region 10a in the first partition portion 71, and thus the effect as the partition 7 is not greatly impaired. Further, a portion where light incident from the second substrate 29 side transmits through the partition 7 is limited to only a portion of the partition 7 along the corner 10f of the display region 10a. Therefore, when a light shielding body is provided at a first substrate 19 and the opposite side of the second substrate 29 with respect to the first substrate 19 to overlap the portion of the partition 7 along the corner 10f of the display region 10a, a reduction in display quality caused by a part of light incident on the second substrate 29 side transmitting through the partition 7 can be suppressed.

MODIFIED EXAMPLE OF EXEMPLARY EMBODIMENT 3

Figure 13:
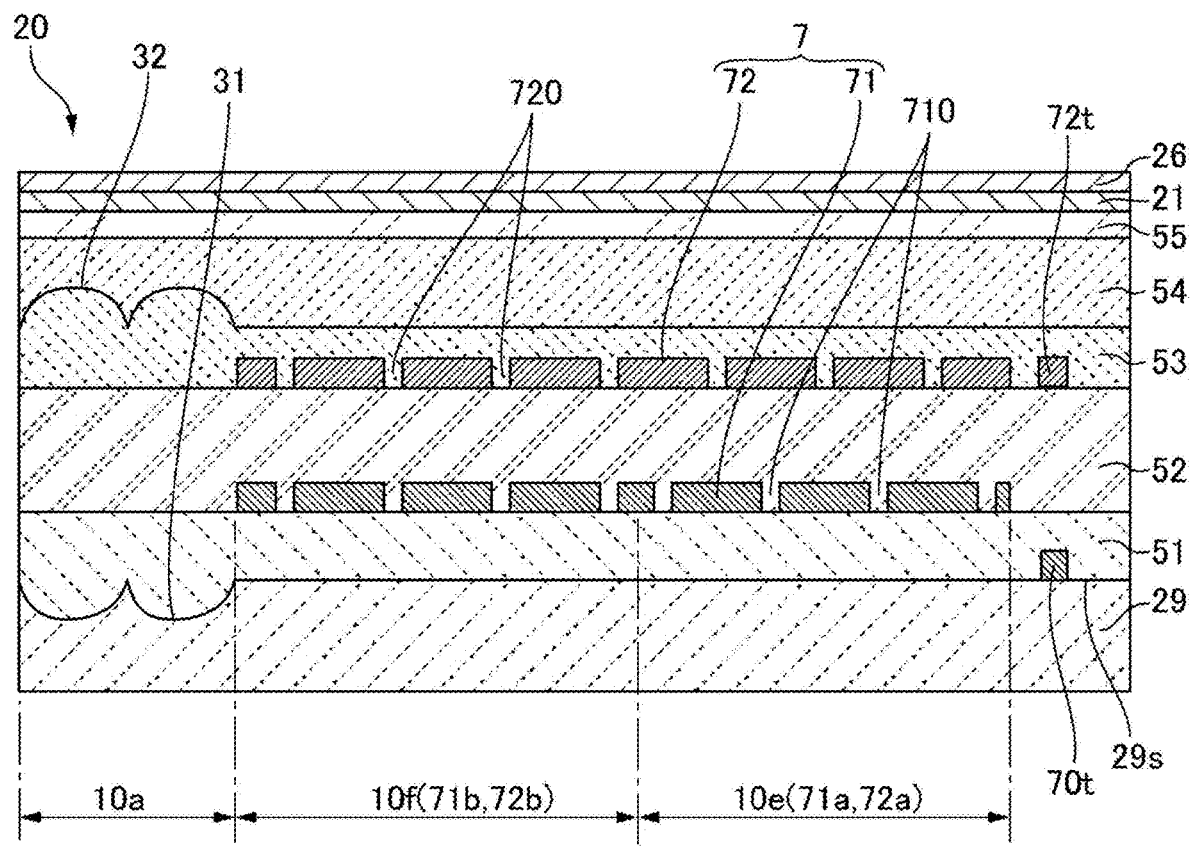
FIG. 13 is an explanatory diagram of a partition of an electro-optical device according to a modified example of Exemplary Embodiment 3 of the present disclosure.

FIG. 13 is an explanatory diagram of a partition 7 of an electro-optical device 100 according to a modified example of Exemplary Embodiment 3 of the present disclosure. As illustrated in FIG. 13, also in the exemplary embodiment, similar to Exemplary Embodiment 1, a first partition portion 71 extending along an outer edge of a display region 10a is provided between a first lens 31 and a first optical path length adjustment layer 52, and a second partition portion 72 extending along the outer edge of the display region 10a is provided between the first optical path length adjustment layer 52 and a second lens 32. The second partition portion 72 is provided with a plurality of first openings 720, which are bored through the second partition portion 72, along the outer edge of the display region 10a in the entire extending direction of the second partition portion 72. Therefore, the same effect as that in Exemplary Embodiment 1 is achieved.

In the exemplary embodiment, in the first partition portion 71, a second opening 710 is formed in a portion 71b extending along a corner 10f of the display region 10a, and the second opening 710 is further formed also in a portion 71a extending along a side 10e of the display region 10a. Here, the second opening 710 formed in the portion 71b extending along the corner 10f of the display region 10a in the first partition portion 71 overlaps the first opening 720 formed in the second partition portion 72 in plan view. Therefore, light incident from a second substrate 29 side reaches a liquid crystal layer 80, and thus impurities in the liquid crystal layer 80 move to a position spaced from the display region 10a while remaining in a state of being activated by light, and then coagulate in the position. Thus, a reduction in display quality such as image sticking (stain) due to the coagulated impurities is less likely to occur.

Further, the second opening 710 formed in the portion 71a extending along the side 10e of the display region 10a in the first partition portion 71 is shifted from the first opening 720 formed in the second partition portion 72 in plan view. Therefore, the same effect as that in Exemplary Embodiment 2 is achieved in such a way that the effect as partition 7 is not greatly impaired and the like.

EXEMPLARY EMBODIMENT 4

Figure 14:
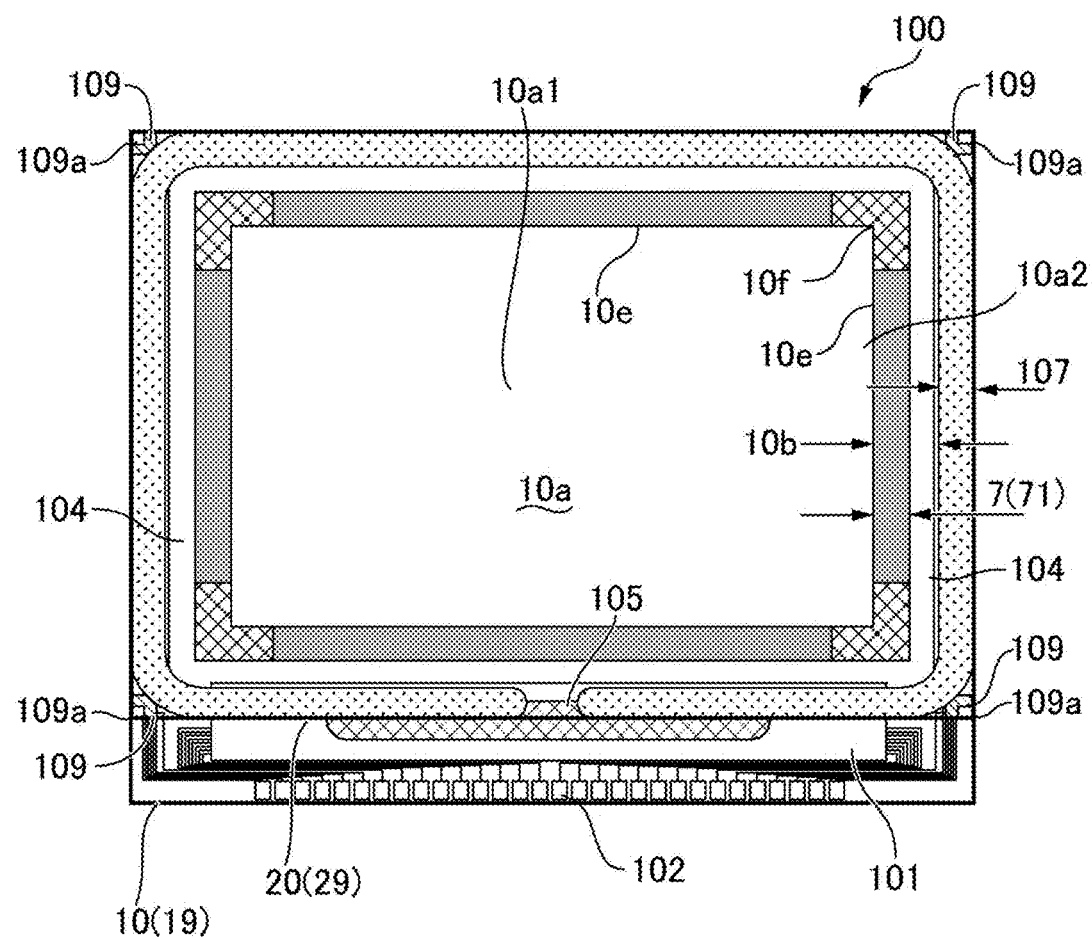
FIG. 14 is an explanatory diagram schematically illustrating a planar configuration of an electro-optical device according to Exemplary Embodiment 4 of the present disclosure.
Figure 15:
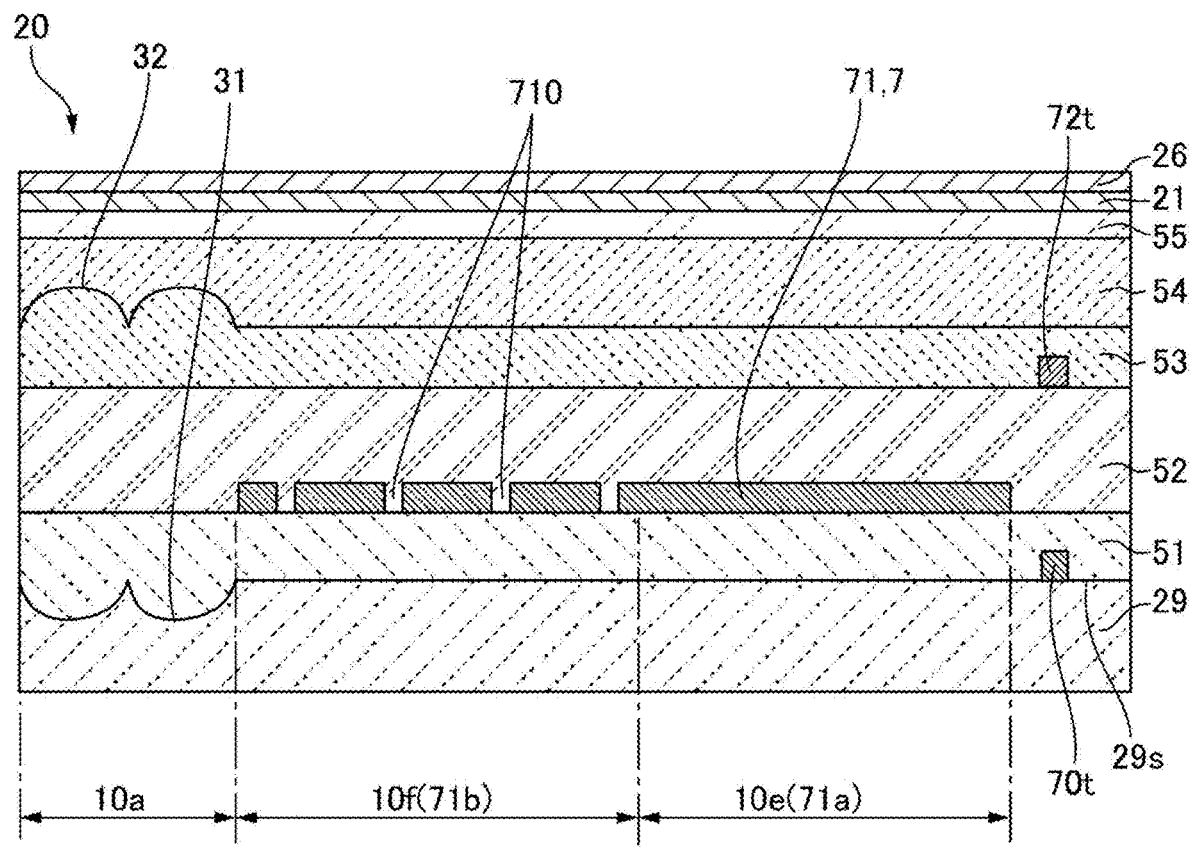
FIG. 15 is an explanatory diagram of a partition illustrated in FIG. 14.

FIG. 14 is an explanatory diagram schematically illustrating a planar configuration of an electro-optical device 100 according to Exemplary Embodiment 4 of the present disclosure. FIG. 15 is an explanatory diagram of a partition 7 illustrated in FIG. 14. In the exemplary embodiment, as illustrated in FIGS. 9 and 10, of portions between a first lens 31 and a first optical path length adjustment layer 52 and between the first optical path length adjustment layer 52 and a second lens 32, a partition portion (first partition portion 71) extending along an outer edge of a display region 10a is provided only between the first lens 31 and the first optical path length adjustment layer 52, and a second partition portion 72 is not provided. Therefore, the same effect as that in Exemplary Embodiment 2 is achieved.

In the exemplary embodiment, the first partition portion 71 is provided with a second opening 710 in a portion 71b extending along a corner 10f of the display region 10a. In contrast, the second opening 710 is not formed in a portion 71a extending along a side 10e of the display region 10a. Therefore, light incident from a second substrate 29 side transmits through the second opening 710 and reaches a liquid crystal layer 80, and thus impurities in the liquid crystal layer 80 move to a position spaced outward from the corner 10f of the display region 10a while remaining in a state of being activated by light, and then coagulate in the position. Thus, a reduction in display quality such as image sticking (stain) due to the coagulated impurities is less likely to occur.

Further, the second opening 710 is not formed in the portion 71a of the first partition portion 71 extending along the side 10e of the display region 10a, and thus the same effect as that in Exemplary Embodiment 2 is achieved in such a way that the effect as the partition 7 is not greatly impaired and the like.

Configuration Examples of Projection-Type Display Device

Figure 16:
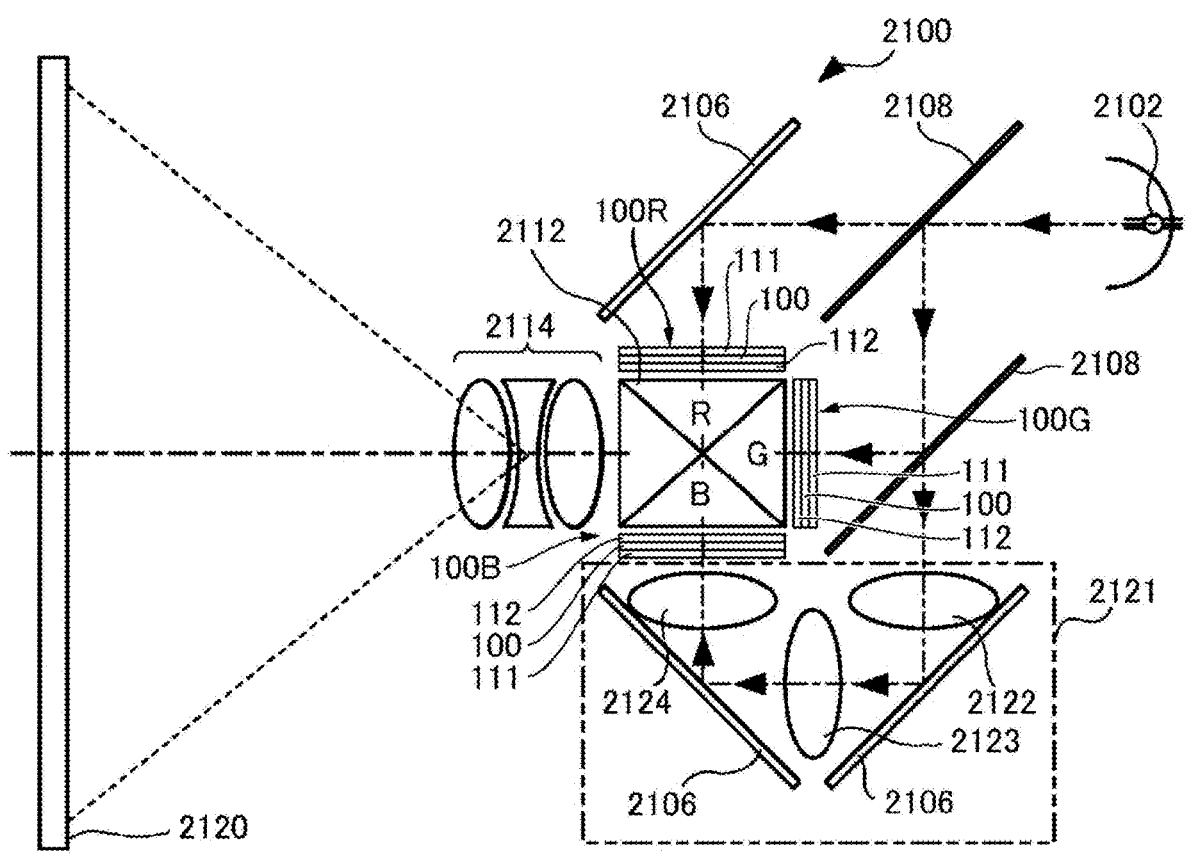
FIG. 16 is an explanatory diagram of a projection-type display device using a transmission type electro-optical device.

A projection-type display device (liquid crystal projector) will be described as one example of electronic apparatuses using the electro-optical device 100 according to the exemplary embodiments described above. FIG. 16 is an explanatory diagram of a projection-type display device using a transmission type electro-optical device. A projection-type display device 2100 illustrated in FIG. 16 is provided with the electro-optical device 100 to which the present disclosure is applied, a light source unit configured to emit light to be supplied to the electro-optical device 100, and a projection optical system configured to project light modulated by the electro-optical device 100.

The projection-type display device 2100 is provided with a lamp unit 2102 (light source unit) including a white light source, such as a halogen lamp. Projection light emitted from the lamp unit 2102 is split into three primary colors of red (R), green (G), and blue (B) by three mirrors 2106 and two dichroic mirrors 2108 installed inside. The split projection light is guided to light valves 100R, 100G, and 100B corresponding to the primary colors, respectively and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color. Here, each of the light valves 100R, 100G, and 100B includes an incident-side polarization separation element 111 overlapping at the incident side with the electro-optical device 100, and an emission-side polarization separation element 112 overlapping at the emission side with the electro-optical device 100.

The light modulated by each of the light valves 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, an image of the each of the primary colors is synthesized, and subsequently a color image is projected on a screen 2120 by a projection lens group 2114 (projection optical system).

Other Projection-Type Display Device

A projection-type display device may be configured to use, as a light source unit, an LED light source configured to emit light in various colors, and the like to supply light in various colors emitted from the LED light source to respective different light valves.

Other Electronic Apparatuses

The electronic apparatus including the electro-optical device 100 to which the present disclosure is applied is not limited to the projection-type display device 2100 of the above-described exemplary embodiment. Examples of the electronic apparatus may include a projection-type Head-Up Display (HUD), a direct-view type Head-Mounted Display (HMD), a personal computer, a digital still camera, and a liquid crystal television.

What is claimed is:

1. An electro-optical device comprising:
an element substrate including a pixel electrode in a display region;
a counter substrate including a common electrode that has a light-transmitting property, and facing the pixel electrode; and
a liquid crystal layer disposed between the element substrate and the counter substrate, wherein
the counter substrate includes
a first lens disposed between the counter substrate and the common electrode and overlapping the pixel electrode in plan view,
a first optical path length adjustment layer disposed between the first lens and the common electrode,
a second lens disposed between the first optical path length adjustment layer and the common electrode and overlapping the first lens in plan view,
a second optical path length adjustment layer disposed between the second lens and the common electrode,
a first partition portion having a light shielding property, the first partition portion being disposed between the first lens and the first optical path length adjustment layer and extending along an outer edge of the display region, and
a second partition portion having a light shielding property, the second partition portion being disposed between the first optical path length adjustment layer and the second lens and extending along the outer edge of the display region, and
the second partition portion includes, along the outer edge of the display region, a plurality of first openings bored through the second partition portion.

2. The electro-optical device according to claim 1, wherein the first partition portion includes a plurality of second openings bored through the first partition portion.

3. The electro-optical device according to claim 2, wherein
the plurality of second openings are disposed along the outer edge of the display region, and
the plurality of second openings are shifted from the first openings in plan view.

4. The electro-optical device according to claim 2, wherein
the display region is a quadrangle in plan view, and
the plurality of second openings overlap the first openings in plan view in corner portions of the quadrangle, which are located diagonally.

5. The electro-optical device according to claim 4, wherein the plurality of second openings are shifted from the first openings in plan view in a portion extending along a side of the quadrangle.

6. The electro-optical device according to claim 1, wherein an opening ratio of the first openings in the second partition portion is greater than or equal to 15%.

7. The electro-optical device according to claim 1, wherein the first openings are disposed at the same pitch as that of the pixel electrodes.

8. An electro-optical device comprising:
an element substrate including a pixel electrode in a display region;
a counter substrate including a common electrode that has a light-transmitting property, and facing the pixel electrode; and
a liquid crystal layer disposed between the element substrate and the counter substrate, wherein
the counter substrate includes
a first lens disposed between the counter substrate and the common electrode and overlapping the pixel electrode in plan view,
a first optical path length adjustment layer disposed between the first lens and the common electrode,
a second lens disposed between the first optical path length adjustment layer and the common electrode and overlapping the first lens in plan view,
a second optical path length adjustment layer disposed between the second lens and the common electrode, and
a partition portion disposed only between the first lens and the first optical path length adjustment layer, among between the first lens and the first optical path length adjustment layer and between the first optical path length adjustment layer and the second lens, and extending along an outer edge of the display region.

9. The electro-optical device according to claim 8, wherein the display region is a quadrangle in plan view, and the partition portion includes, along corner portions of the quadrangle that are located diagonally, openings bored through the partition portion.

10. The electro-optical device according to claim 1, wherein a film thickness of the first optical path length adjustment layer is greater than or equal to a film thickness of the second optical path length adjustment layer.

11. The electro-optical device according to claim 1, wherein the first optical path length adjustment layer is a silicon oxynitride film.

12. An electronic apparatus comprising the electro-optical device according to claim 1.

13. The electronic apparatus according to claim 12 comprising:

a light source unit configured to emit light to be supplied to the electro-optical device; and a projection optical system configured to project light modulated by the electro-optical device.

* * * * *